(No Model.)
W. H. PHENICE.
KITCHEN CABINET.
No. 522,485. Patented July 3, 1894.
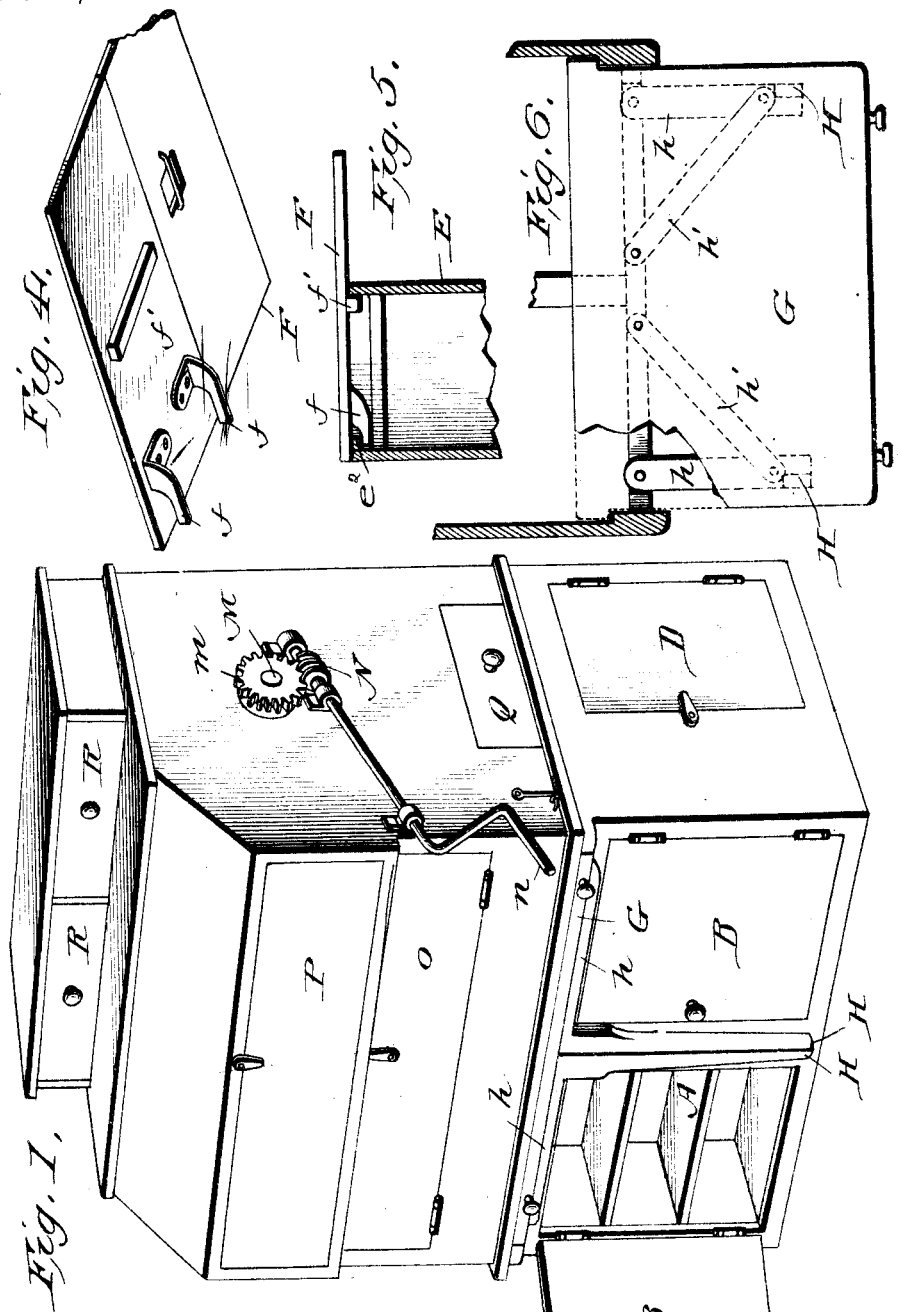
Witnesses
Inventor
William H. Phenice
By Attorneys

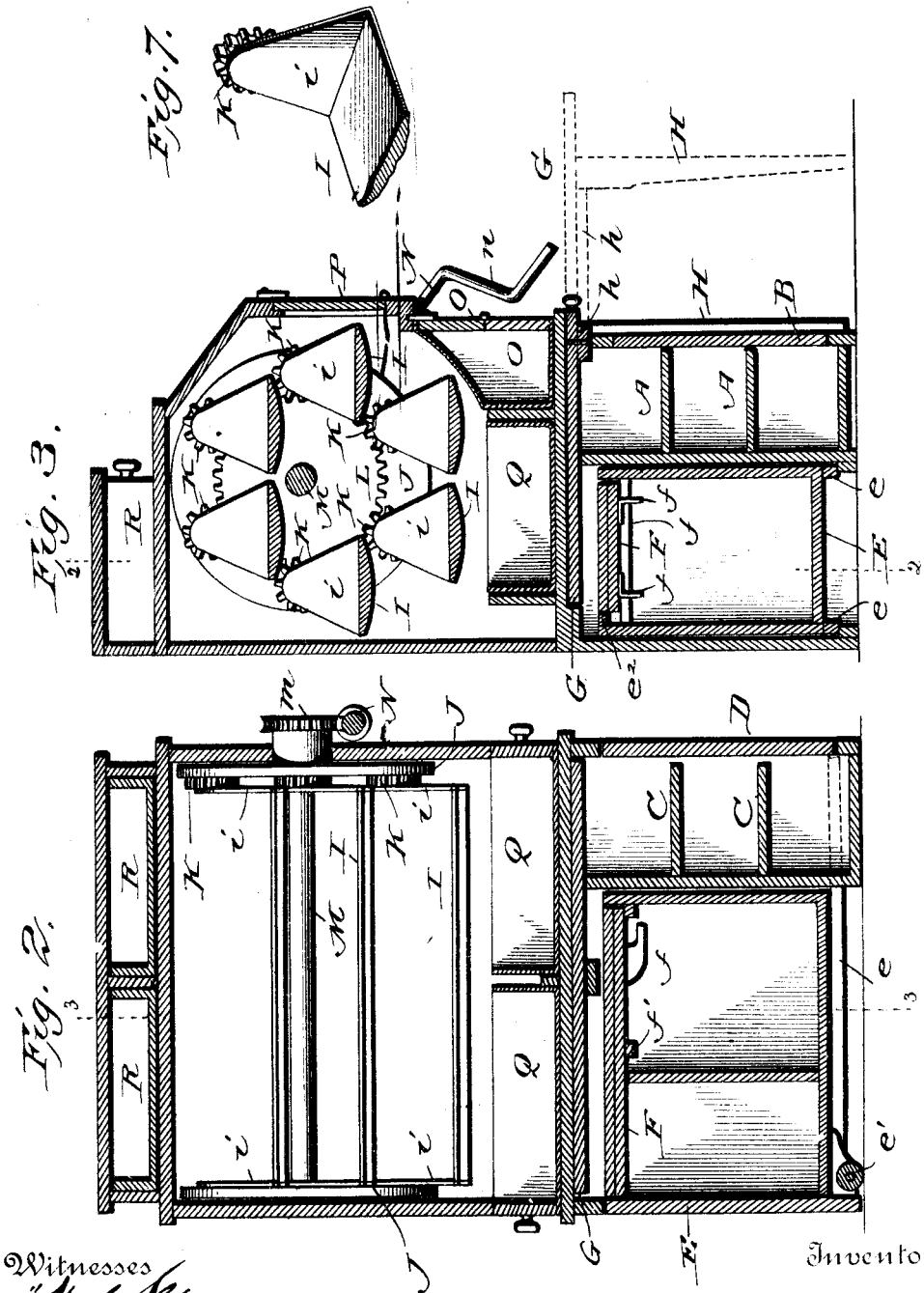

UNITED STATES PATENT OFFICE.

WILLIAM HENRY PHENICE, OF SOUTH PERRY, OHIO.

KITCHEN-CABINET.

SPECIFICATION forming part of Letters Patent No. 522,485, dated July 3, 1894.

Application filed July 19, 1893. Serial No. 480,926. (No model.)

*To all whom it may concern:*

Be it known that I, WILLIAM HENRY PHENICE, a citizen of the United States, residing at South Perry, in the county of Hocking, State of Ohio, have invented certain new and useful Improvements in Kitchen-Cabinets; and I do hereby declare the following to be a full, clear, and exact description of the invention, such as will enable others skilled in the art to which it appertains to make and use the same.

This invention relates to that class of house furnishing commonly designated as kitchen cabinets, and is designed to provide in one structure suitable shelves, compartments and drawers for the various articles, condiments and other things used for culinary purposes.

The invention consists of the novel features and the peculiar construction and combination of the parts which will be hereinafter more fully described and claimed and which are shown in the annexed drawings, in which—

Figure 1 is a perspective view of a cabinet embodying the invention, the lower left hand door being open. Fig. 2 is a vertical section on the line 2—2 of Fig. 3 looking to the left, the shelves and their actuating mechanism being shown in full lines. Fig. 3 is a cross section on the line 3—3 of Fig. 2 looking to the right. Fig. 4 is a detail view of the cover for the flour chest. Fig. 5 is a detail view showing the manner of attaching the cover to the flour chest when the said cover is to be used as a kneading board. Fig. 6 is a top plan view of the sliding pastry or kneading board showing the manner of connecting the folding legs thereto. Fig. 7 is a detail view of an end portion of one of the shelves showing the hanger and the pinion attached thereto.

The cabinet is composed essentially of an upper and lower structure which may be separately formed for convenience of handling and admitting of each having an independent use, or constructed together as desired to meet the requirements of the trade. The lower part is provided in its front side with a series of shelves A which are closed by double doors B. A space is provided in the rear of the shelves A. A series of shelves C is arranged at one end of this space and opens out through the side and is closed by a door D. A flour chest E is adapted to slide in the other part of the said space through the opposite side of the cabinet. Bars $e$ provided on each side of the flour chest guide the same in its movement and support the inner end when the chest is drawn out its full length.

The front end of the chest is supported on a roller $e'$. A cleat $e^2$ is provided on one side of the chest and the top thereof is closed by a cover F which is composed of two boards that are hinged together. One of the boards is provided on its under side near one end with two hooks $f$ which are adapted to engage with the cleat $e^2$ and hold the cover in place when the same is used as a pastry or kneading board. A cleat $f'$ on the said board with the hooks $f$ engages with the opposite side of the flour chest and prevents the disengagement of the hooks $f$ from the cleat $e^2$ when the board is in use. By having the cover composed of two boards which are hinged together an extended surface is obtained when required as will be readily observed. A sliding shelf G is arranged immediately over the stationary shelves C and is adapted to slide in and out and forms a table or desk when required. Two legs H are attached to strips $h$ which are pivoted at their inner ends to a cross bar of the cabinet. Braces $h'$ are pivoted at their inner ends to the sliding shelves and at their outer ends to the strips $h$ near the outer ends of the latter, the parts being so disposed that on drawing out the shelf G the legs H will simultaneously move outward and support the outer end of the said shelf and when pushing in the said shelf the legs will fold out of the way.

The upper portion of the cabinet is provided with a series of revolving shelves I which have vertical hangers $i$ at their ends by means of which the said shelves are pivotally connected to heads or disks J (or spiders). One set of the hangers $i$ is provided with pinions K which are adapted to mesh with a gear wheel L secured to one of the heads J. These pinions K are fixed to the hangers to which they are attached so as not to have an independent motion thereof. The heads J are secured to the ends of a shaft M which is journaled at its ends in the sides of the cabinet.

one of the journals being extended and provided with a worm wheel $m$ or bevel gear which is in mesh with a worm or bevel gear shaft N journaled in suitable bearings on one side of the cabinet. This worm or bevel gear shaft N is provided with a crank $n$ by means of which the same is rotated to impart motion to the shaft M and rotate the heads J to bring the required shelf within easy reach.

The purpose of the pinions K and the gear wheels L is to hold the shelves in a horizontal position and prevent any lateral motion thereof which would have a tendency to displace articles resting thereon. Immediately in front of the space in which the shelves revolve and directly above the sliding shelf G are disposed a series of compartments O for the storing of coffee, tea, sugar, &c. These compartments may be formed in a connected series or may be separate as desired, being closed at their upper ends by a door o which opens downward. The door P above the compartments o and adapted to open downward permits of access being had to the shelves.

The water tight drawers Q, one at each side of the cabinet immediately in the rear of the compartments O, are adapted to receive ice or a cooling medium to preserve and cool the articles stored on the shelves I. Two drawers R are located above the revolving shelves I to receive cutlery, &c.

Having thus described my invention, what I claim, and desire to secure by Letters Patent, is—

1. In a kitchen cabinet, the combination with a series of revolving shelves accessible through an opening in the front of the cabinet which is closed by a door, a drawer Q located below the shelves and adapted to receive the ice and slide through an opening in the side of the cabinet, a series of compartments O located in the space in front of the drawer Q and below the outer portion of the series of revolving shelves, substantially as described.

2. In a kitchen cabinet the combination with a flour chest E having cleat $e^2$, of a folding pastry board adapted when closed to form a cover for the chest, having cleat $f'$ and hooks $f$, the latter engaging with the cleat $e^2$ to hold the board in place when in use as a kneading board, substantially as described.

3. The herein shown and described kitchen cabinet comprising a series of shelves A which are closed by doors B, a series of shelves C at one side closed by door D, a flour chest D at the opposite side, a cover F for the flour chest constructed to form a pastry or kneading board, a sliding shelf G arranged over the flour chest and shelves C and A, movable legs H connected with and operated with the said sliding shelf, a series of revolving shelves I held from lateral swinging by gearing substantially in the manner set forth, a series of compartments O located in front of the shelves I and over the sliding shelf G, water tight drawers Q adapted to slide through the side of the cabinet and contain a cooling medium, as ice, the drawers R above the series of revolving shelves to receive cutlery &c. substantially as set forth.

In testimony whereof I affix my signature in presence of two witnesses.

WILLIAM HENRY PHENICE.

Witnesses:
JASPER N. MORRIS,
GEORGE A. WEAVER.